March 25, 1930.  H. W. NIEMAN  1,751,652
SYNCHRONOUS AMPLIFYING CONTROL MECHANISM
Original Filed Jan. 8, 1926    4 Sheets-Sheet 1
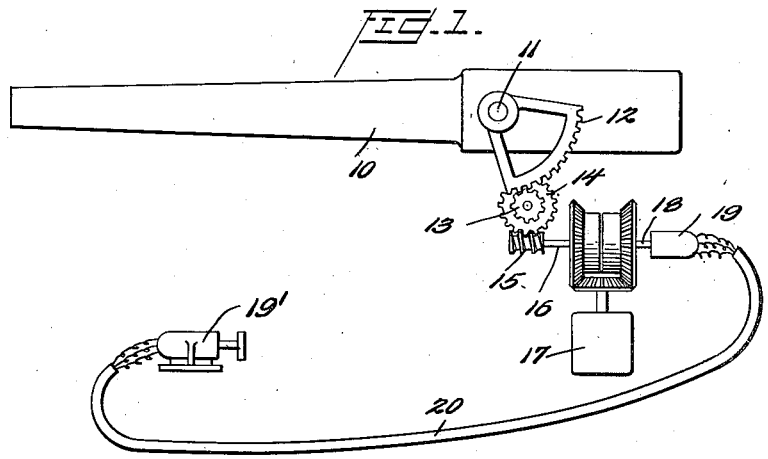
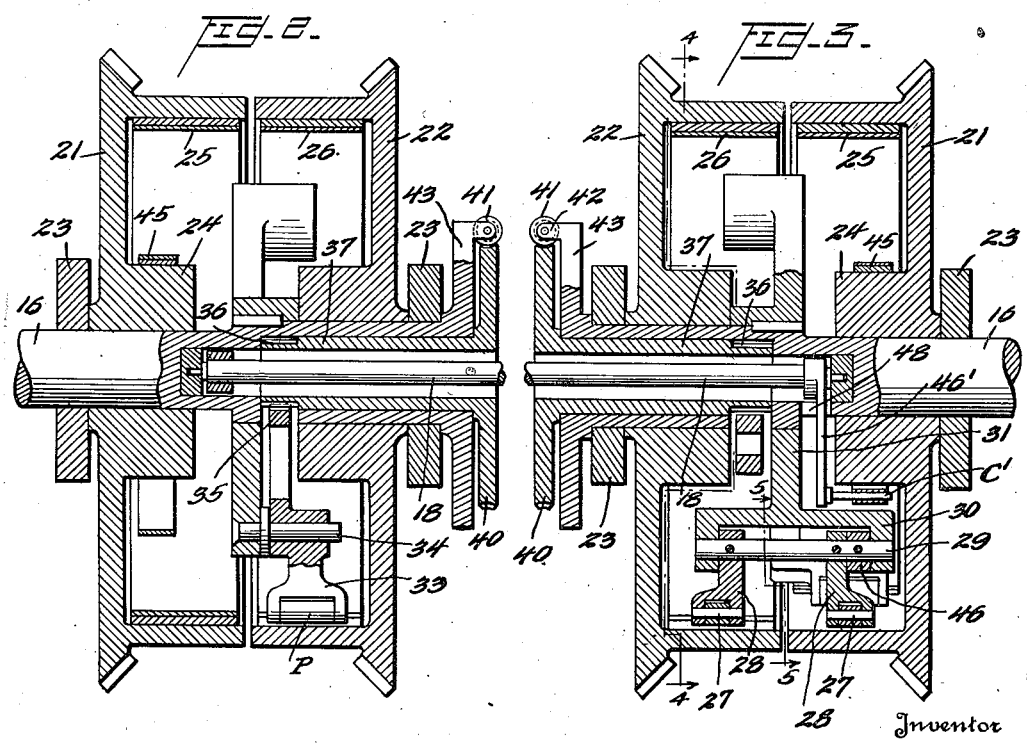
Inventor
Henry W. Nieman
By Watson, Coit, Morse & Grindle
Attorney

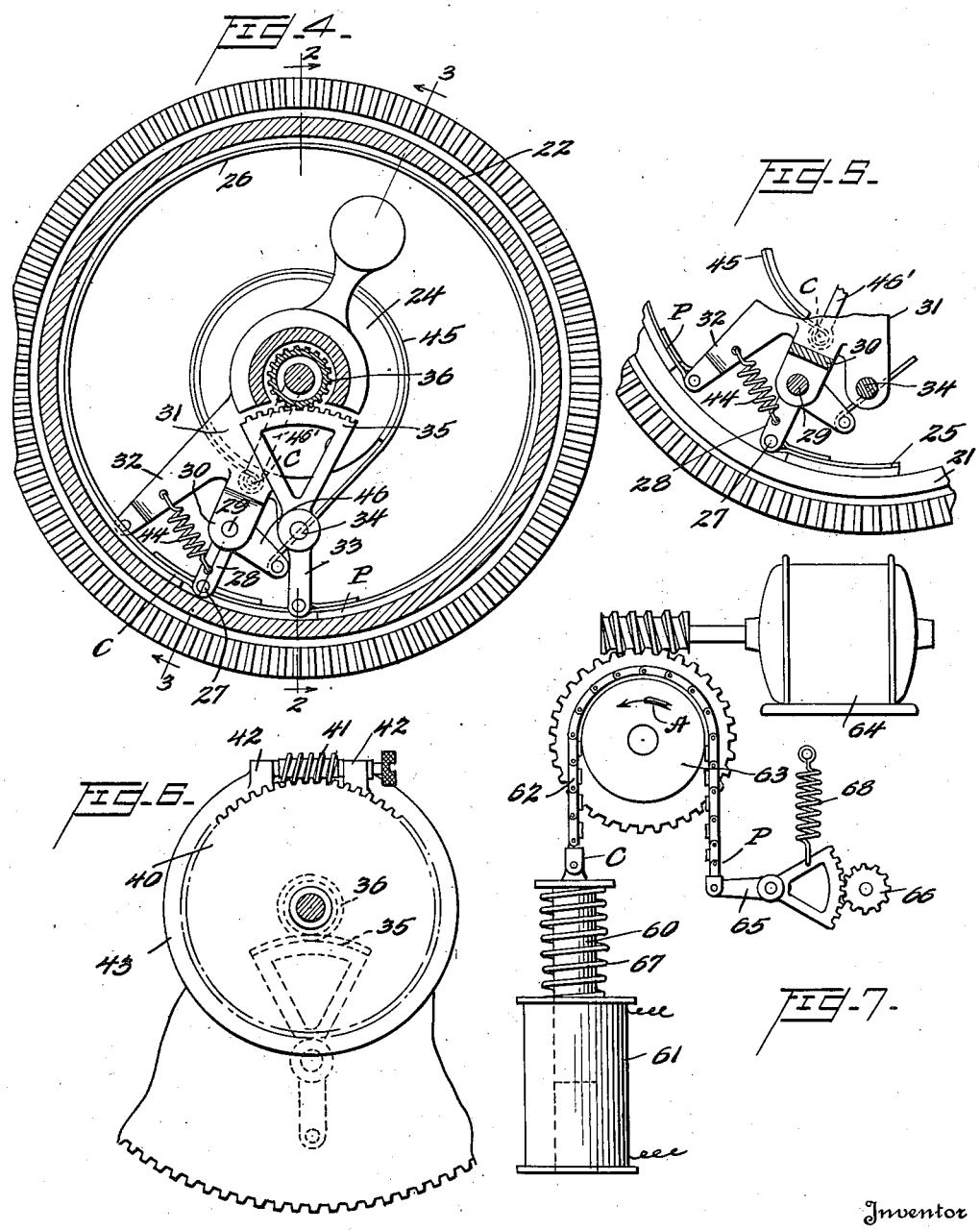

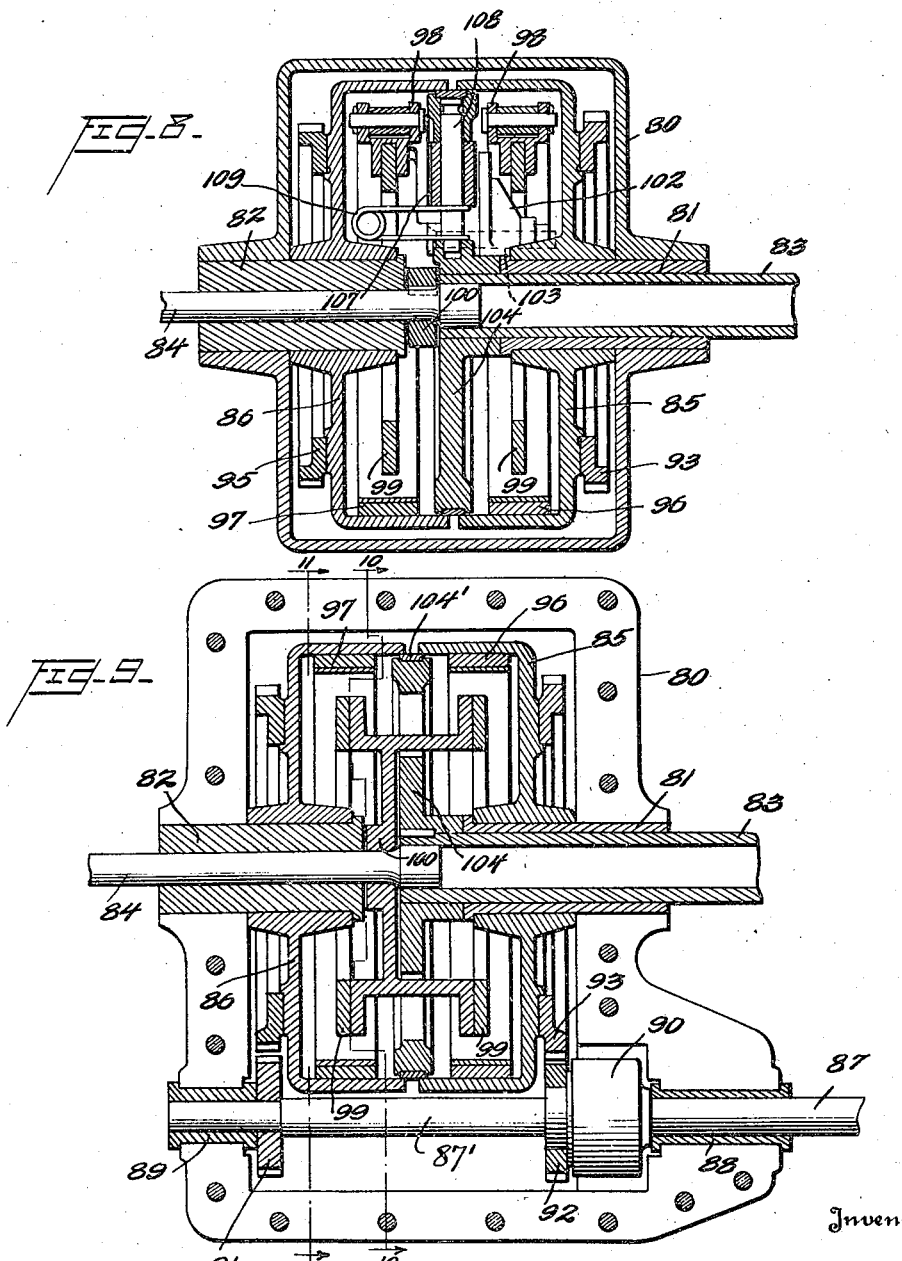

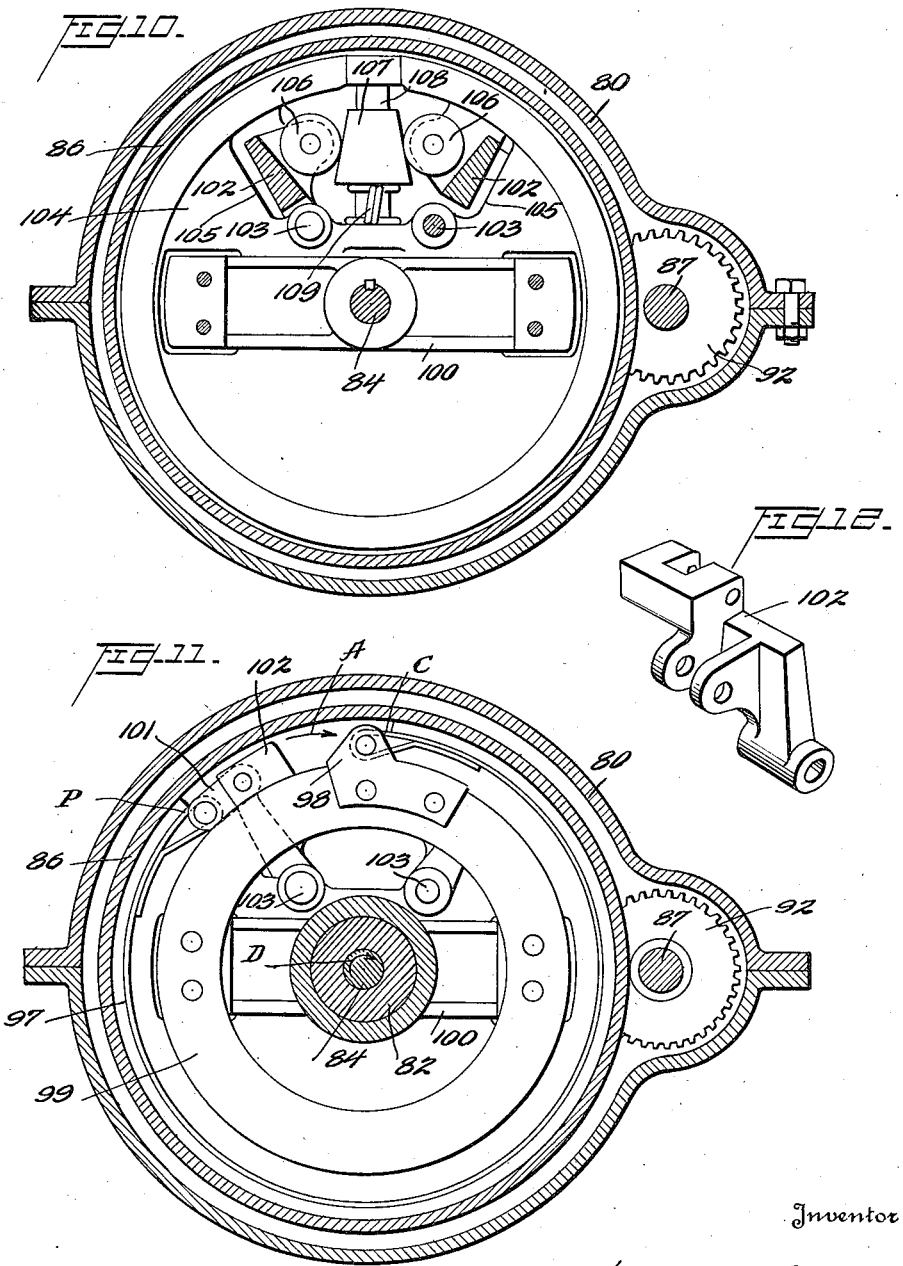

Patented Mar. 25, 1930

1,751,652

UNITED STATES PATENT OFFICE

HENRY W. NIEMAN, OF BETHLEHEM, PENNSYLVANIA

SYNCHRONOUS AMPLIFYING CONTROL MECHANISM

Original application filed January 8, 1926, Serial No. 79,956. Divided and this application filed July 20, 1929. Serial No. 379,815.

The present invention relates to mechanisms for operating or manipulating a large and heavy or frictionally retarded body by mechanical power and in such manner that the body moves at all times in close sympathy with a control device, which device is in itself capable of developing only a very small portion of the power required for the actual movement or manipulation of such body.
It has heretofore been suggested that bodies of great size or weight, or which are strongly retarded frictionally, may be automatically moved to correspond with the movements of a control device, such mechanisms including means for taking power from a suitable power source under the control of the control device. It has been found however that, in the operation of each such appliance of the prior art, there was either an objectionable time lag or an objectionable space lag, or both, between the control device and the body or mechanism being operated. Efforts to eliminate such undesirable lagging have not met with success, or at most, with only limited success, and it has generally been the result that, where such an attempt has been made, the apparatus has been rendered much more complex in structure and correspondingly less reliable in operation.
The object of the invention is to provide a means for effecting and controlling the movements of a heavy body or instrumentality, or body acted upon by extraneous forces, by two motors, a power motor and a control motor, the former supplying the principal portion of the power to effect such movement and the latter controlling the extent of such movement, in such manner that the body moves at all times in close sympathy with the control motor, and having for every position of the control motor a corresponding unique position of the body. This correspondence of position of the control motor and body I have here designated as a syntactic relationship.
A problem, the solution of which has been many times attempted in the past without success, is that of gun control from a distant point. The difficulty of this ploblem arises from the fact that the gun must be pointed speedily and with the greatest accuracy, and the telemetric means by which the gun control data is transmitted from observers to a receiving station is in itself entirely too weak to actually effect training of a gun. For this reason it has always been found necessary, up to this time, to employ a human link between the telemetric receiver and the gun to be directed. By means of an apparatus constructed in accordance with my present invention however, this human link may be entirely eliminated and the gun trained, quickly and accurately, by means operable from a distant point, notwithstanding the fact that the gun may be of great weight and the frictional forces opposing movement of considerable magnitude.

The telemetric receiver commonly employed in gun control apparatus is capable of delivering a very small torque, for instance a torque of $\frac{1}{10}$ inch-ounce, without destroying its accuracy. A gun may require for instance a torque of 5 pound-feet to rotate or elevate it. The torque required to manipulate the gun therefore, is some 10,000 times greater than the maximum torque which may be delivered by the telemetric receiving apparatus and it is apparent that means must be interposed between the telemetric receiving apparatus and the gun to step-up the negligible power output of the telemetric receiving apparatus if the gun is to be automatically controlled thereby.

By utilizing a mechanism constructed in accordance with the principles of this invention, which mechanism is hereinafter designated a "synchronous amplifying control mechanism", it is entirely feasible to manipulate the gun directly and automatically from the telemetric receiving apparatus and without the interposition of the human link that has been heretofore found necessary to supply the requisite power. A mechanism for accomplishing this function is illustrated in the accompanying drawings and will be hereinafter described in detail.

The improved synchronous amplifying control mechanism is adapted for many uses and to the solution of various problems throughout the mechanical arts. It is therefore contemplated that the design and arrangement of the component elements of the mechanism may be modified to suit conditions and that also the ratio of power amplification from the automatic or other control motor to the work member which performs the ultimate desired operation, may be changed within a wide range in developing mechanisms for the manipulation of bodies and mechanisms of different weights and characters.

For the purpose of amplifying the very small power of the control motor to such degree that the particular object to be manipulated may be freely moved I employ a mechanism which I designate a "servo-mechanism" and which may be of the type disclosed in my co-pending application Serial 79,956, filed January 8, 1926, of which the present application is a division, or of the type disclosed in my co-pending application Serial 5,327, filed January 28, 1925. The servo-mechanisms disclosed and claimed in my co-pending application are of general utility and adapted for wide use with various types and classes of machines, such mechanisms being adapted to be either controlled manually or by some mechanical or electrical device. The present invention comprehends specifically the combination, with a control motor of great delicacy and negligible power consumption, of a servo-mechanism of great power amplification, by means of which a very large or heavy body may be so manipulated that it bears at all times, and in all of its positions, a syntactic relationship to the movable element of the control motor, and without at the same time destroying the accuracy of the control motor by imposing thereon an excessive load.

The invention contemplates particularly a servo-mechanism which employs "wrapping friction" bands to take power from a power driven rotatory member to step-up the power of the control motor, since by means of such elements great amplification may be had without loss of accuracy. In certain instances however the control mechanism may include servo-mechanisms which do not utilize wrapping friction bands, and yet be quite capable of performing the required functions. In every case however the servo-mechanism is of the friction type, i. e., is designed to take power frictionally from the power source by friction members, and in every instance there is substantially constant contact between the power driven member or members and the friction means which takes therefrom, it being the function of the control motor to modify the intensity of this constant frictional engagement of the friction surfaces, so that an amount of power is transmitted to the member being manipulated which is just sufficient to effect its movements in proper relationship to those of the control element of the control motor.

In the accompanying drawings several forms of the synchronous amplifying control mechanism are illustrated, by way of example.

In the drawings:

Figure 1 is a rather diagrammatic illustration of the synchronous amplifying control mechanism as applied to a pivotally mounted gun;

Figure 2 is an axial section through the servo-mechanism shown in Fig. 1, the section being taken on line 2—2 of Figure 4;

Figure 3 is a similar view, the section being taken on line 3—3 of Fig. 4;

Figure 4 is a transverse section through the servo-mechanism, the section being taken on line 4—4 of Fig. 3;

Figure 5 is a fragmentary section taken on line 5—5 of Fig. 3;

Figure 6 is an elevation of a portion of the mechanism;

Figure 7 is a diagrammatic view of a synchronous amplifying control mechanism which is designed particularly for the control of valves, dampers or the like in accordance with minor fluctuations in current of a control motor of small power consumption;

Figure 8 is an axial section through a second form of servo-mechanism well adapted for use as an element of the improved synchronous amplifying control mechanism;

Figure 9 is also an axial section therethrough, but taken in a different plane;

Figure 10 is a transverse section, taken on line 10—10 of Figure 9;

Figure 11 is also a transverse section, taken on line 11—11 of Figure 9; and

Figure 12 is a perspective view of a detail.

A mechanism of very simple type for automatically elevating a gun and depressing the same from a distant point is illustrated in Fig. 1. The gun is indicated at 10 and is mounted to rotate in a vertical plane about horizontal trunnions, one of which is indicated at 11. Rigid with the gun is a toothed segment 12, the teeth of which mesh with those of an operating pinion 13 mounted to rotate about a fixed axis. Rigid with pinion 13 is a worm wheel 14 which meshes with a worm 15 on the end of the work member 16 of a servo-mechanism of the two-drum type, such for instance as illustrated in Figures 2, 3, 4, 5 and 6 of the drawings. The worm and worm wheel constitute an irreversible gearing, the gun being locked in any position into which it may be adjusted in such manner that it cannot communicate a turning force to the work shaft 16.

The drums of this servo-mechanism are rotated rapidly in opposite directions by a power motor 17. The control element 18 of the servo-mechanism is rigidly connected to the rotor of the receiving motor 19 of an alternating current data transmission system, motor 19 being connected by suitable electrical conduits 20 to a second similarly constructed transmitting motor 19' positioned at a distant point, as in the plotting room of a fire control station. The rotor of motor 19 normally carries a pointer or indicating member but in this case it is removed and the rotor connected directly, or through a suitable coupling, to the control element of the servo-mechanism. Movement of the rotor of motor 19′ results in synchronous movements of the rotor of motor 19 and hence of synchronous movement of the control element 18 of the servo-mechanism. Movement of the work member 16 of this servo-mechanism is synchronous with the movement of its control element 18 and, since the work member is capable of developing many times as much power as has been imparted to the control element (and the mechanism will be designed in every case to furnish an ample amount of power for the purpose intended), the gun may be freely elevated or depressed.

If the gun is of large size, the servo-mechanism may amplify the power of the receiving motor 10,000 times or more and for such large power amplification, a servo-mechanism having a plurality of stages of amplification may be utilized, such for instance as that disclosed in Figures 2 to 6. This servo-mechanism will now be described in detail.

The drums 21 and 22 of this servo-mechanism are rotatably mounted upon the work shaft 16, which shaft is supported in bearings 23. The drums are provided with internal hubs, the outer surface of one of which, i. e., the outer surface of the hub 24 of drum 21, constitutes a cylindrical friction face. The bands 25 and 26 have their control ends C looped around co-axial pins 27 which are positioned at the outer ends of arms 28, the inner ends of these arms being non-rotatably secured upon a rocker shaft 29. This short shaft is rotatably mounted in aligned bearings in the channel shaped projection 30 of a web 31 which is integral with or keyed to the work shaft.

The power end P of band 25 is secured to a radially extending arm 32 which is integral with web 31 while the power end P of band 26 is secured to the outer end of a lever 33 pivoted at 34 to a short projecting portion of web 31. The inner end of lever 33 is provided with a toothed segmental portion 35 the teeth of which mesh with the teeth of a pinion 36 integral with the sleeve 37 which closely fits within the hollowed-out work shaft 16. At its outer end sleeve 37 is provided with a worm wheel 40, the teeth of which mesh with a worm 41 rotatably journaled in lugs 42 formed on the periphery of a disk 43 integral with the work shaft. Rotation of the worm therefore results in rotation of sleeve 37 and pinion 36, resulting in movement of lever 33 and hence in contraction or expansion of band 26.

The control ends of the bands are manipulated by rocking the rock shaft 29. This rock shaft is moved in one direction by the action of a spring 44 which normally tends to draw it in a clockwise direction (Fig. 4) the opposite end of the spring being secured to the rigid arm 32, and is drawn in the opposite direction by the pull of a third friction band 45, the power end of which is connected to an arm 46 which is also keyed or otherwise non-rotatably secured to rock shaft 29. Friction band 45 passes around the inner drum 24 previously referred to and has its control end C connected to the outer end of a control arm 46′ of the control element 18, which element extends axially through the sleeve 37. The work shaft is slotted at 48 for the passage of the control arm 46′.

With the drums in rotation, but with no torque being exerted on the control element, the parts occupy the positions in which they are shown in Figure 4, the bands being in light frictional engagement with their associated drums and each taking the same amount of power therefrom, so that no movement of the work member results. The spring 44 is tending to bring the band 26 into closer engagement with its drum but the action of the spring is counter-balanced by the pull of band 45, which is in light constant engagement with drum 24. Under these conditions the control ends of the bands will not be moved in either direction. If the control element 18 is rotated so as to move the control arm 46′ in a counter-clockwise direction, however, (Figure 4) the inner band 45 will bear more heavily upon the drum 24, and will exert a sufficient pull on arm 46 to move this arm upwardly (Fig. 4) against the action of spring 44, and hence to cause band 26 to bear less heavily upon its associated drum and cause band 25 to bear more heavily upon the drum with which it is associated, with the result that the work shaft is rotated in a counter-clockwise direction. If however the control arm 46′ is moved in a clockwise direction (Fig. 4) the normally constant frictional pull of band 45 on arm 46 will be somewhat relieved and spring 44 will be effective to rock shaft 29 slightly in a clockwise direction with the result that band 26 will bear less heavily against its associated drum and band 25 will grip the corresponding drum with greater intensity. In this case the work shaft will be rotated in a clockwise direction. At any time when it appears that there is excessive frictional losses due to tightness of engagement of bands 25 and 26 with their respective drums, or objectionable looseness of the bands resulting in what is known as "backlash" or vibration between the tight position of one band and the tight position of the other, the worm 41 may be rotated by the thumb screw provided to effect the desired band adjustment.

A simple form of the synchronous amplifying control mechanism is shown in Figure 7.

Here the plunger 60 of a solenoid magnet 61 is connected to the control end C of a wrapping friction band 62. This band passes around a drum 63 which is driven in the direction of the arrow A by an electric motor 64, and the power end P of the band is connected to one end of a pivotally mounted lever 65, the opposite end of this lever being segmental in shape and is provided with teeth which mesh with those of a pinion 66. Pinion 66 may operate in turn any desired form of control mechanism, such as a damper or fuel regulating device. The plunger 60 of the solenoid will move downwardly as the magnetic attraction of the solenoid increases due to an increased flow of current therethrough, to cause the friction band to operatively engage, or engage with greater intensity, the rotating drum, and hence the work member 65 will be actuated. A spring 67 opposes downward movement of the plunger and causes it to assume a definite position for any given flow of current through the solenoid. A second spring 68 acting on the work member 65 returns the work member when the pull of the band is relieved.

The current which flows through the solenoid may come from any one of a number of sources. For instance the mechanism illustrated may be applied to a steam boiler plant so that the plunger 60 may move in sympathy with the fluctuations of steam pressure. In such a case the pinion 66 may regulate the flow of air to the combustion chamber or grate or may otherwise regulate the fuel supply.

A second form of servo-mechanism, which has proven in actual practice to be particularly serviceable when employed as an element of the synchronous amplifying control mechanism is illustrated in Figures 8 to 12 inclusive, and will now be described in detail. This mechanism is fully disclosed and claimed in my copending application Serial 79,956.

The moving parts of the mechanism are enclosed in a two-part casing 80 which may be of pressed steel or other suitable material. Fixed in aligned apertures in the casing are the co-axial sleeves 81 and 82 respectively, which constitute bushings within which the co-axial shafts 83 and 84 rotate and which also comprise journals upon which the hubs of the rotatable drums 85 and 86 may freely revolve. The shafts 83 and 84 telescope slightly midway of the casing but are not secured together. The shaft 83 comprises the work member of the servo-mechanism and the shaft 84 the control element.

A power shaft 87, receiving power from a suitable source, and mounted in the bushing 88, is normally connected by a one way clutch 90 with driving shaft 87″, aligned therewith, and mounted in a bushing 89. Mounted upon driving shaft 87′ are pinions 91 and 92, the teeth of pinion 92 meshing directly with those of a toothed annulus 93 rigidly secured to drum 85, and the teeth of pinion 91 meshing with those of an idler (not shown), which idler in turn meshes with those of a second toothed annulus 95 rigid with drum 86. It will be obvious that rotation of power shaft 87 in one direction will cause rotation of drums 85 and 86 respectively, in opposite directions.

The drums are cup-shaped members having flanges perpendicular to the web portions and are so disposed that the flanges extend toward each other, the parallel edges thereof being separated by only a slight gap. The cylindrical inner faces of the flanges comprise friction surfaces, and against these surfaces lightly bear the friction bands 96 and 97 respectively. These bands are similar, comprising metallic strips with facings of cork or other suitable material. Each band has a control end C and a power end P, and they extend in opposite directions around the drums from their control ends, which ends are substantially in the same radial plane. The control end of each band is looped around a shackle member 98, these shackle members being rigidly secured to similar spaced parallel rings 99—99 respectively, which are in turn fastened by riveting or otherwise at diametrically opposed points to a cross-arm 100 which is keyed on the control element 84, the outer ends of the cross-arm 100 being channel-shaped to provide suitable portions to which these rings may be secured.

The power ends of the two bands are provided with similar links 101—101, and these links are connected to the upper ends of similarly formed rocker arms 102, the lower ends of the rocker arms being pivotally mounted upon studs 103 which extend outwardly in opposite directions from a large central transverse disk 104 which is keyed to the work member 83. The rocker arms in effect cross each other, both passing through an opening 105 in the central disk 104, and each rotatably supports in the plane of this disk an anti-friction roller 106. These rollers bear respectively against the inclined faces of an outwardly tapering wedge 107 which is axially apertured to receive a rod 108 upon which it is slidably mounted. A spring 109 of any suitable form urges the wedge radially outward and tends to separate the anti-friction rollers and hence to separate the rocker arms and to force the power ends of the bands lightly against their respective drums.

The rod 108 has ends firmly mounted in the margins of the aperture 105 in disk 104 and comprises, in reality, an integral part of the disk. The periphery of disk 104 is provided with a felt band 104′ which lightly presses against the margins of the inner friction faces of the drums, and this band effectively prevents the entrance of dust within the space between the drums.

Assuming the driving shaft to be rotating continuously in one direction, it will be seen that the drums will be rotated continuously in opposite directions, drum 86, for instance, rotating in the direction of the arrow A shown in Figure 11. Both bands will have normal light frictional contact with their respective drums because of the action of the spring 109 and the wedge 107. The tendency toward frictional retardation of the drums will, however, be only slight, the pressure of the bands against the drums in the normal case being extremely light. Assuming, however, that the control shaft 84 is rotated by a power motor of the type described in the direction of the arrow D, Figure 11, it will be apparent that the control end of band 97 will be moved in the direction of rotation of its associated drum and that this band will frictionally engage the drum with increased force. The band thus engaged with the drum takes from the drum an amount of power which is determined by the torque transmitted to the control element 84 by the control motor, and this power is delivered by the power end P of the band, through the corresponding rocker arm and anti-friction roller 106 to the wedge 107. The wedge is so designed as to be immovable on its supporting rod 108 under the action of only one of the anti-friction rollers; that is, when one only of the bands is effectively engaged with its associated drum, the radial component of the force exerted by the roller on the wedge is less in magnitude than the force necessary to overcome the frictional resistance of the wedge to inward sliding. Hence the wedge comprises a firm abutment, and the power delivered by the power end of the band is transmitted directly to the disk 104 and hence to the work shaft 83 to which the disk is keyed.

This movement of shaft 84 in the direction of arrow D serves to tighten band 97 but to decrease the pressure of band 96 against its associated drum, although not to necessarily totally disengage this band and drum. There is, therefore, little or no opposition within the mechanism to the rotation of the work shaft 83. Rotation of the control shaft 84 in a direction opposite to that indicated by the arrow D will result in the lightening of the frictional contact between band 97 and its drum and the effective engagement of band 96, so that the work shaft 83 is likewise turned in the opposite direction.

The wedge 107 is so designed that when either of the bands alone is active to transmit power thereto, it constitutes a firm and non-yielding abutment, as has been previously pointed out. If there is, however, at any time, a tendency of both bands to engage their respective drums so that both anti-friction rollers 106 act simultaneously upon the wedge 107 with oppositely directed and equal, or nearly equal, forces, it will be obvious that the frictional resistance of the wedge to sliding on rod 108 will disappear and that the wedge will move radially inward against the action of spring 109 to relieve or prevent any simultaneous effective gripping action of the bands on their associate drums. The wedge, therefore, and its associated mechanism comprises an automatic adjusting device which prevents excessive frictional losses due to simultaneous engagement of the bands, insures that the bands are kept in light frictional engagement with their respective drums so that there is no lost motion present with possibility of backlash or vibration, and it further comprises a wear compensating medium since it is equally operative in all positions in which it may be placed and, as wear occurs in the parts of the mechanism, will move outwardly, taking up any play which may have resulted from such wear.

This form of servo-mechanism has proven to be very effective in actual operation, when used in conjunction with a control motor and large object to be operated in syntactic relationship therewith, but various other types of servo-mechanisms may be employed if desired, including those which give larger amplification of power.

In the appended claims the control motor is said to have an "indicating member" but it will be understood that this term broadly designates any member which moves under the influence of relatively weak forces to indicate change of position of, or change of condition in, a body, substance or instrumentality, and does not mean merely a pointer or other such visual member. The "indicating members" of control motors of different types may vary widely in shape, position, structure and mode of operation, but each "control motor" contemplated by the present invention is of such nature that its indicating member will be distorted from its true position if called upon to exert any substantial force or torque. That is, it is characteristic of a "control motor" that, in order to exert any useful torque or force whatever, its rotor or movable element must be displaced from its theoretically correct position. For example, in synchronous amplifying control mechanism for the control of a gun, shown diagrammatically in Fig. 1, the control motor 19 is a receiving motor of an alternating current data transmission system, the rotor of which, at no load, (rotor disconnected from the shaft 18) indicates with an error of approximately one degree the position of the rotor of the distant motor 19'. Under operating conditions (i. e. with rotor connected with shaft 18) it is possible with the synchronous amplifying control mechanism to abstract sufficient torque from the rotor of the control motor, to manipulate the gun without, in the normal case, displacing the rotor by more than one degree from its corresponding no load position.

Having thus described the invention, what is claimed as new and desired to be secured by Letters Patent is:

1. The combination with a control motor of the class described, having an indicating member movable under the influence of relatively weak forces to indicate change of condition in or position of a body, substance or instrumentality, and which member is itself capable of exerting an appreciable force only when displaced from its theoretically correct position and is tending to move toward the same, of a work member, a power driven member, and a mechanical connection between the indicating member and the work member having a portion adapted to take power from the power driven member by frictional engagement therewith upon movement of the indicating member of the control motor, whereby movement of the work member is effected by power, the indicating member and work member having corresponding syntactic positions throughout their ranges of movement.

2. The combination with a control motor of the class described, having an indicating member movable under the influence of relatively weak forces to indicate change of condition in or position of a body substance or instrumentality, and which member is itself capable of exerting an appreciable force only when displaced from its theoretically correct position and is tending to move toward the same, of a rotatable work shaft, a member driven by power to rotate about a fixed axis and having a friction face, and a mechanical connection between the indicating member and the work member having a portion which has a constant frictional engagement with the power driven member and which is adapted to take power from the power driven member, upon movement of the indicating member of the control motor and to transmit it to the work shaft, whereby movement of the work shaft is effected by power, the indicating member and work member having corresponding syntactic positions throughout their ranges of movement.

3. The combination with a control motor of the class described having an indicating member movable under the influence of relatively weak forces to indicate change of condition in, or position of, a body, substance or instrumentality, and which member is itself capable of exerting an appreciable force only when displaced from its theoretically correct position and is tending to move toward the same, of a work member, a power source including a constantly rotating member having a cylindrical friction face, and a wrapping friction band having constant engagement with the friction face of said constantly rotating member, the control end of the band being connected to the indicating member and the power delivery end to the work member, the indicating member and work member having corresponding syntactic positions throughout their ranges of movement.

4. The combination with a control motor of the class described, having an indicating member movable under the influence of relatively weak forces to indicate change of condition in, or position of, a body, substance or instrumentality, and which member is itself capable of exerting an appreciable force only when displaced from its theoretically correct position and is tending to move toward the same, of a rotatable work shaft, a source of power including a constantly rotating member having a cylindrical friction face, a wrapping friction band having substantially its entire length in constant frictional engagement with the friction face of the power driven member, the control end of the band being operatively connected to the indicating member and the power delivery end to the work shaft, the indicating member and work member having corresponding syntactic positions throughout their ranges of movement.

5. The combination with a control motor of the class described having an indicating member movable in two directions under the influence of relatively weak forces and which indicates change in condition in, or position of, a body, substance or instrumentality, and which member is itself capable of exerting an appreciable force only when displaced from its theoretically correct position and is tending to move toward the same, of a work member operatively connected to an object or instrumentality to be operated in syntactic relationship to the indicating member, said member being likewise operable in two directions, a constantly available power source including two members moving constantly in opposite directions, a friction member associated with each power driven member and in constant but normally ineffective engagement therewith, each such friction member being connected to the indicating member so as to be operated thereby, and a connection between each friction member and the work member, whereby the power taken from either power driven member by its associated friction member may be transmitted to the work member, the object connected to the work member being so actuated thereby that it bears a syntactic relationship to the control member at all times.

6. The combination of a control motor of the class described having an indicating member movable under the influence of relatively weak forces to indicate change of condition in or position of a body, substance or instrumentality, and which member is itself capable of exerting an appreciable force only when displaced from its theoretically correct position and is tending to move toward the same, of a work member movable in two directions, a source of power including two members driven constantly in opposite directions, and means connecting the indicating member and the work member, said means including two friction members, each in constant though normally ineffective frictional contact with its associated power driven member and arranged to take power therefrom when called into action by the indicating member and to transmit it to the work member, whereby movement of the work member in either direction is effected by power, the greater part of which is supplied by the power source.

7. The combination with a control motor of the class described, having an indicating member movable under the influence of relatively weak forces to indicate change of condition in or position of a body, substance, or instrumentality, and which member is itself capable of exerting an appreciable force only when displaced from its theoretically correct position and is tending to move toward the same, of a work member movable in two directions, a power source including two members driven constantly in opposite directions, means connecting the indicating member and work member including two friction members, each in constant though normally ineffective frictional contact with its associated power driven member and arranged to take power therefrom under the control of the indicating member and to transmit it to the work member, and means including an irreversible gearing for connecting the work member to a body or instrumentality to be operated syntactically with respect to the indicating member.

8. The combination with a control motor of the class described, having an indicating member movable under the influence of relatively weak forces to indicate change of condition in or position of a body, substance or instrumentality, and which member is itself capable of exerting an appreciable force only when displaced from its theoretically correct position and is tending to move toward the same, of a work member movable in two directions, two members driven by power in opposite directions, a friction member associated with each power driven member and in constant but normally ineffective engagement therewith, a connection between each friction member and the work member, a connection between each friction member and the indicating member for bringing either into effective engagement with its associated power driven member, and means for controlling the normal ineffective pressures of the friction members against their respective power driven members.

9. The combination with a control motor of the class described having an indicating member movable in two directions under the influence of relatively weak forces and which indicates change in condition in or position of a body, substance or instrumentality, and which member is itself capable of exerting an appreciable force only when displaced from its theoretically correct position and is tending to move toward the same, of a work member operatively connected to an object or instrumentality to be operated in syntactic relationship to the indicating member, said member being likewise operable in two directions, a constantly available power source including two members constantly rotating about a common axis in opposite directions, a wrapping friction band associated with each such rotating member and in constant but normally ineffective engagement therewith, each such friction band being connected to the indicating member so as to be operated thereby, and a connection between each friction band and the work member, whereby the power taken from either power driven member by its associated friction member may be transmitted to the work member, the object connected to the work member being so actuated thereby that it bears a syntactic relationship to the indicating member at all times.

10. The combination with a control motor of the class described having an indicating member movable under the influence of relatively weak forces to indicate change of condition in or position of a body, substance or instrumentality, and which member is itself capable of exerting an appreciable force only when displaced from its theoretically correct position and is tending to move toward the same, of a work member movable in two directions, two power driven members rotating in opposite directions about a common axis and having cylindrical friction faces, and means connecting the indicating and work members, said means including two wrapping friction bands normally lightly engaging respectively the cylindrical friction faces, each such band being adapted to be individually brought into effective frictional engagement with its associated frictional engagement with its associated frictional face upon movement of the indicating member, so as to take power frictionally therefrom and transmit it to the work member, whereby movement of the work member in either direction may be effected by power, the greater portion of which is supplied by the power driven member.

In testimony whereof I hereunto affix my signature.

HENRY W. NIEMAN.